United States Patent
Gross et al.

[11] Patent Number: 5,892,804
[45] Date of Patent: Apr. 6, 1999

[54] ONE-WAY IMPLODABLE TAG CAPSULE WITH HEMISPHERICAL BEADED END CAP FOR LWR FUEL MANUFACTURING

[75] Inventors: Kenny Gross, Bolingbrook; John Lambert, Wheaton, both of Ill.

[73] Assignee: The United States of America as represented by the Department of Energy, Washington, D.C.

[21] Appl. No.: 982,889

[22] Filed: Dec. 2, 1997

[51] Int. Cl.⁶ .................................................. G21C 17/04
[52] U.S. Cl. ........................... 376/261; 376/251; 376/450
[58] Field of Search ................................... 376/251, 253, 376/261, 412, 450

[56] References Cited

U.S. PATENT DOCUMENTS

| | | | |
|---|---|---|---|
| 4,302,295 | 11/1981 | Shimada | 376/450 |
| 4,495,141 | 1/1985 | Ozaki | 376/251 |
| 4,659,544 | 4/1987 | Sawayama et al. | 376/450 |
| 4,971,750 | 11/1990 | Duncan et al. | 376/261 |

*Primary Examiner*—Daniel D. Wasil
*Attorney, Agent, or Firm*—Bradley W. Smith; Mark P. Dvorscak; William R. Moser

[57] ABSTRACT

A capsule containing a tag gas in a zircaloy body portion having a hemispherical top curved toward the bottom of the body portion. The hemispherical top has a rupturable portion upon exposure to elevated gas pressure and the capsule is positioned within a fuel element in a nuclear reactor.

6 Claims, 3 Drawing Sheets

CAPSULE OUTSIDE DIAMETER = 6.0mm
CAPSULE WALL THICKNESS = 0.50mm
IMPLODABLE END CAP THICKNESS = 0.05mm
BEAD DIAMETER = 0.50mm
END CAP CURVATURE = SPHERICAL, RADIUS = 3.0mm
CAPSULE HEIGHT = 18.68mm
CAPSULE VOLUME = 1.00cc
ALL MATERIALS ARE ZIRCALOY

IMPLODABLE NIPPLE DISLOCATOR AFTER HELIUM BACKFILL

ONE-WAY IMPLODABLE TAG CAPSULE WITH HEMISPHERICAL BEADED END CAP FOR LWR FUEL MANUFACTURING

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

Fuel failures that occur during routine operation of nuclear reactors can lead to lengthy shutdowns to find the leaking assemblies using current failed-fuel identification means (fuel sipping and eddy-current testing). This can lead to lost revenue and increased radiation exposure for the plant staff during sipping operations. Argonne National Laboratory (ANL) has developed a system called gas tagging for accurate and inexpensive identification of failed fuel assemblies. The gas tagging method consists of the addition of small quantities of enriched noble gas isotopes to each fuel pin in the reactor during pin manufacturing. By systematically varying the compositions of tag gas isotopes from one fuel assembly to another throughout the reactor, each assembly is characterized by it's own unique "tag". If a fuel pin develops a defect during subsequent operation, its tag gas is released to the coolant system along with fission gases that build up inside the pin. Analysis of an off gas sample from the reactor using a mass spectrometer pinpoints the assembly containing the failed pin.

Gas tagging allows failed fuel to be identified during full power operation, thereby saving the utility critical pathway down time, minimizing worker radiation exposure, and enabling core management activities to be initiated in advance of a shutdown. Gas tagging will increase industrial competitiveness for the U.S. nuclear utilities, and hold down electricity costs for consumers and U.S. industrial customers.

Although gas tagging requires only a small quantity of gas for each fuel pin (1 ml or less), the gas itself is expensive and any wastage of gas during fuel pin manufacturing must be minimized. Estimates of wasted gas range from 3 ml to 200 ml per pin, depending upon the fuel vendor. For a wastage of 3 ml, gas tagging is still economically attractive to utility customers. However, for wastage in the range of 200 ml/pin, the cost of tagging would be prohibitive. (Tag gas will cost between $0.10 and $1.25 per ml, and a typical pressurized water reactor core contains $10^5$ pins per core).

Current options available to fuel vendors for addressing this problem include (1) modifying their fuel fabrication line to minimize gas wastage; (2) add a laser-puncture unit down stream of the fuel fab line to puncture the pin, add the tag gas, and reseal the puncture; and (3) integrate Argonne National Laboratory's fluid-based technology for recovery of the wasted tag gas. However, none of these options is appropriately viable at this time.

SUMMARY OF THE INVENTION

Accordingly, an object of the invention is to provide an inexpensive method of tagging fuel elements when the elements are fabricated.

Another object of the invention is to provide a capsule containing the gas tag which retains its integrity during fuel element evacuation but releases the tag gas during backfill.

Yet another object of the invention is to provide a rupturable capsule containing the tag gas which is compatible with the fuel pin cladding.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

A technical solution that overcomes the need for concern about wasted tag gas is disclosed. In our invention, tag gas is encapsulated into small zircaloy capsules inserted into the upper plenum of each fuel pin before end-cap welding. The last step in a fuel pin manufacturing is to evacuate the fuel pin and backfill it with helium to a high pressure (approximately 380 psig for PWR pins). The tag gas capsule, which has an internal volume of 1.0 cc, has novel features that allow the tag gas to be released inside the fuel pin, and allow the fuel pin to be subsequently QA'ed for confirmation of tag release.

Figure 1:
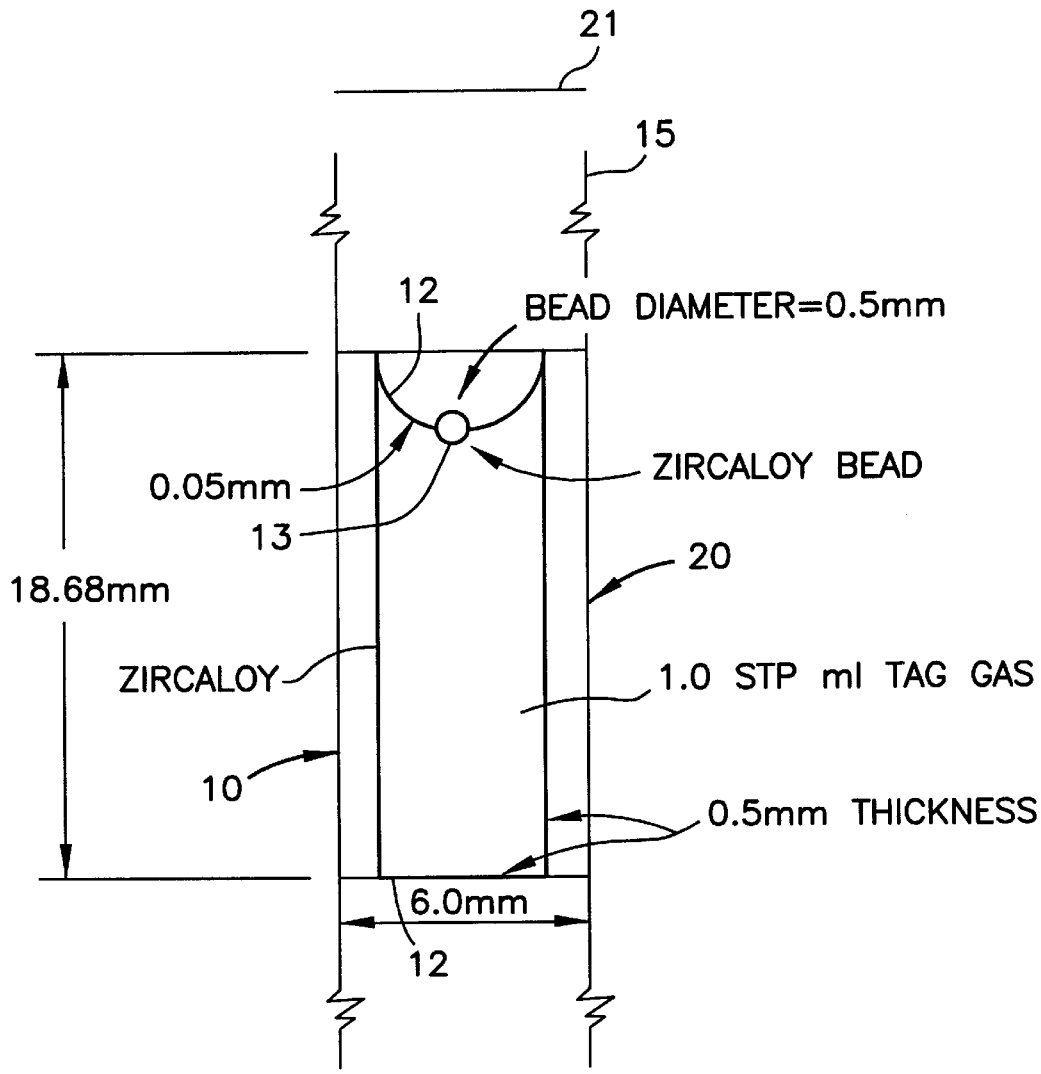
FIG. 1 is a schematic view of a tag gas capsule in a fuel pin assembly.

The tag capsule design is illustrated in FIG. 1. The capsule 10 is preferably cylindrical in shape having a flat bottom 11 and is constructed entirely of zircaloy. This is the material of which the fuel cladding is constructed, and ensures maximum compatibility and neutron economy for the capsule. As seen in FIG. 1, the capsule 10 is positioned in the upper portion 15 of a fuel pin 20 which has a top 21 that is welded in place after the pin 20 has been evacuated and backfilled with helium gas, as will be explained and as is well known in the art.

Figure 2:
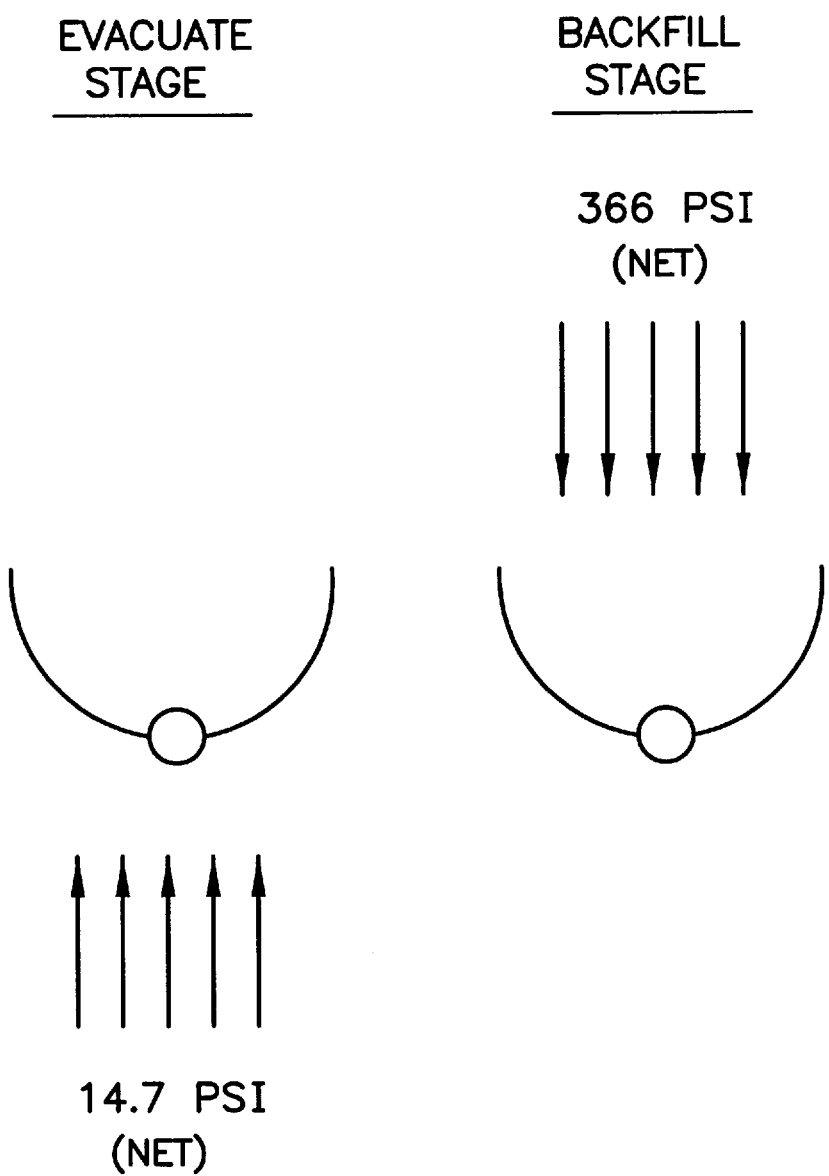
FIG. 2 shows the gas pressure during evacuation and backfill of the tag gas capsule.

The upper end cap 12 of capsule 10 is made from a thin sheet of zircaloy and is constructed in such a way as to have one-way implodability. To achieve this functional requirement, it is designed to be hemispherical, and concave outward as viewed from the top 21 of the fuel pin 20. During the evacuate stage of fuel pin manufacture there will be a net 14.7 PSI outward pressure inside the capsule 10. The spherical construction of the end cap 12 minimizes the "crumpling" stresses on the end cap during this stage, but maximizes the implosion stress during the subsequent backfill stage when there will be a net pressure difference of 364 psi inward (see FIG. 2).

Figure 3:
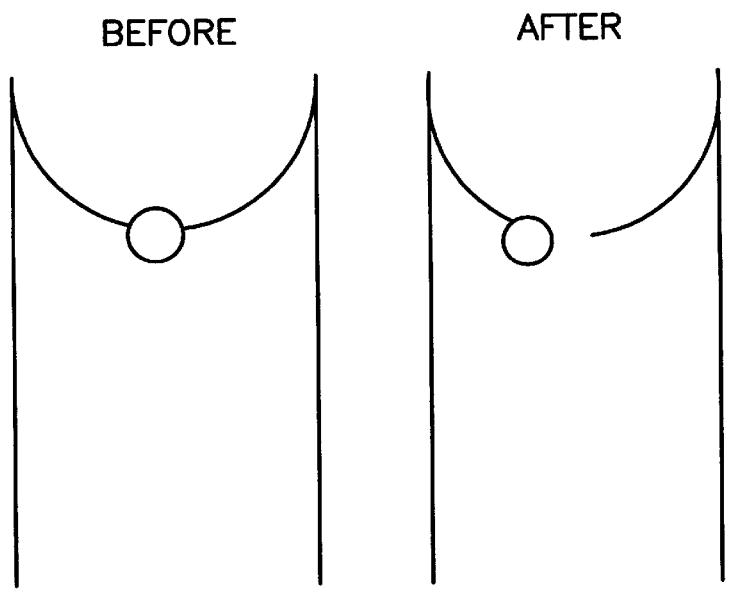
FIG. 3 shows a ruptured tag gas capsule after the backfill.

In addition to the hemispherical construction of the end cap 12, there is a small zircaloy bead 13 in the center of the end cap 12. The end cap 12 metal is thinner at the interface between the bead 13 and the remainder of the end cap 12 to ensure that the initial implosion rupture will be at the bead's surface (see FIG. 3). The purpose of the bead 13 is it to provide maximum opacicity for a subsequent upper fuel-pin radiograph, which will provide visual confirmation of tag gas release for quality assurance (QA) purposes.

In a constructional example of the invention, the wall thickness of capsule 10 is 0.5 mm, the volume is 1 ml at STP (Standard Temperature and Pressure) of the tag gas. The length of capsule 10 is 18.68 mm while the upper end cap thickness is 0.05 mm and the bead diameter is 0.5 mm. The radius of curvature of the upper end cap 12 is 3 mm while the capsule 10 outside diameter is 6.0 mm.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of identifying a failed fuel element in a nuclear reactor core, comprising providing each of a plurality of reactor core fuel elements with a capsule containing a unique mixture of enriched noble gas isotopes, evacuating each fuel element while maintaining the integrity of the capsule, backfilling each fuel element with an inert gas to a pressure sufficient to rupture the capsule releasing the unique mixture of enriched noble gas isotopes in each fuel element, and sealing each fuel element, so as to provide a method of identifying a fuel element after failure thereof resulting in leakage of the unique mixtures of enriched noble gas isotopes into the reactor core.

2. The method of claim 1, wherein each capsule has an internal volume at STP of about 1 ml.

3. The method of claim 1, wherein each capsule has a hemispherical top curved toward the bottom of the capsule.

4. The method of claim 3, wherein each capsule is zircaloy.

5. The method of claim 4, wherein each capsule has a top which is thinner than the remainder of the capsule.

6. The method of claim 4, wherein each capsule ruptures upon exposure to pressure of about 300 psi exterior to the capsule.

* * * * *